Patented May 2, 1939

2,156,464

UNITED STATES PATENT OFFICE 2,156,464

PRODUCTION OF POLYMETHIN DYESTUFFS

Otto Fritz Schulz, Berlin-Wilmersdorf, Germany

No Drawing. Application February 26, 1936, Serial No. 65,866. In Germany March 22, 1935

3 Claims. (Cl. 260—240)

It is known to prepare polymethin-dyestuffs having mid-position substituted alkyl or aryl groups by means of the esters of ortho-carboxylic acids which are derived from acids of the type H.C.(OR)₃ or C(OR)₄. It is also known to prepare such polymethin-dyestuffs by condensation by means of imino-ethers of the type

these compounds have been fully described by Pinner.

It has now been found that polymethin-dyestuffs with mid-position substituted X-alkyl, X-aryl or X-arylalkyl groups can be obtained by the use of esters of iminocarbonic acid and iminodithiocarbonic acid which correspond to the type

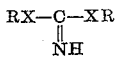

in which formula X can stand for O or S and R for alkyl, aryl or arylalkyl groups and H can be substituted by alkyl or aryl groups.

As the structural formula shows, no dyestuff with mid-position alkyl or aryl groups can be produced with the aid of these esters as is possible with the iminoethers mentioned above. On the contrary with the esters of this type, dyestuffs are always obtained which at the mid-position C atom contain an oxalkyl or thioalkyl group or an oxaryl or thioaryl group.

Dyestuffs with oxalkyl or oxaryl groups in meso positions of the polymethin chain hitherto could only be obtained by the use of derivatives of the first mentioned orthocarboxylic acids.

According to the present invention polymethin-dyestuffs with ox- or thioalkyl or aryl substitutes at the mid-position C-atom are generally obtainable, which are valuable agents for sensitizing silver-halide emulsions; the condensing agents used for the synthesis have the advantage of being readily available. The condensation can also be carried out with salts of the imino-esters.

*1st example.*—2 molecules of ethylimino-dithio-carbonic-acid-diethylester are condensed with 1 molecule of 2-methylbenzthiazoliodethylate in alcohol, acetic anhydride or other suitable condensing agent. The operation results in blue-green crystals, which decompose on melting, of N-N' diethylbenzthiazolmesosulfethylcarbocyanin iodide.

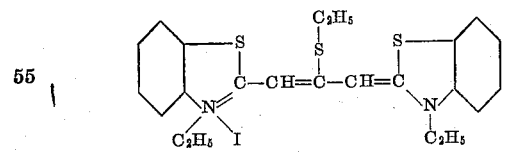

*2nd example.*—From 2 molecules of ethylimino-dithiocarbonic-acid-diethylester and 1 molecule of 2-6 methylquinolinethiodide there are produced green crystals which decompose on melting, of 1,1' diethyl 6,6' dimethylquinolinmesosulfethylcarbocyanin iodide.

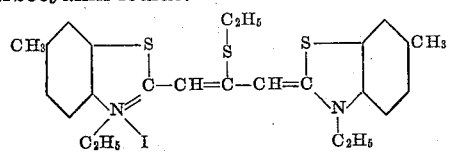

*3rd example.*—2 molecules of iminocarbonic-acid-diethylester are condensed with 1 molecule of 2 methylbenzselenoazol-ethiodide in alcohol, or other suitable solvent. The operation results in blue-red crystals which decompose on melting, of 1-1' diethylbenzseleno-mesooxethyl-carbocyanin iodide.

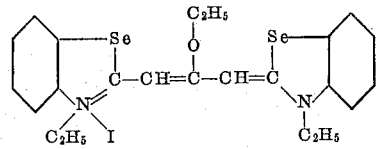

In a corresponding manner heterocyclic quaternary ammonium bases which are monocyclic up to tricyclic or the salts thereof can be condensed to polymethin-dyestuffs.

Thioalkyl- or thioarylcyanines have not hitherto been proposed as sensitizing agents. They have an outstanding sensitizing effect on silver-halide emulsions and also act as stabilizers, which may possibly be ascribable to the sulphur combined with the mid-position carbon atom.

What I claim is:

1. A process for producing meso-substituted carbocyanine salts which consists in condensing one molecular part of a compound selected from the group consisting of alkyl cyclammonium quaternary salts containing a methyl group in a reactive position to the nitrogen atom with two molecular parts of a compound selected from the group consisting of iminocarbonic acids and iminodithiocarbonic acids by means of a condensing agent selected from the group consisting of acetic anhydride and alcohol.

2. As new sensitizing and stabilizing agents for silver halide emulsions, substituted carbocyanine salts having a thioalkyl as meso-substituent.

3. A process for producing meso-substituted carbocyanine salts which consists in condensing one molecular part of an ester selected from the group consisting of iminocarbonic acids and iminodithiocarbonic acids with two molecular parts of a compound selected from the group consisting of 2-methylbenzthiazolethiodide, 2-6 methylquinolinethiodide and 2-methylbenzselenazolethiodide by means of a condensing agent selected from the group consisting of acetic anhydride and alcohol.

OTTO FRITZ SCHULZ.